(12) United States Patent
Johnson

(10) Patent No.: US 8,387,951 B2
(45) Date of Patent: Mar. 5, 2013

(54) APPARATUS AND METHOD OF LIFTING AND MOVING OBJECTS

(76) Inventor: Delano P. Johnson, Wetumpka, AL (US)

( * ) Notice: Subject to any disclaimer, the term of this patent is extended or adjusted under 35 U.S.C. 154(b) by 393 days.

(21) Appl. No.: 12/761,508

(22) Filed: Apr. 16, 2010

(65) Prior Publication Data

US 2010/0264385 A1   Oct. 21, 2010

Related U.S. Application Data

(60) Provisional application No. 61/170,841, filed on Apr. 20, 2009.

(51) Int. Cl.
*B60P 1/48* (2006.01)
*B62B 1/00* (2006.01)
*B62B 7/02* (2006.01)

(52) U.S. Cl. ..................... 254/8 R; 280/47.29

(58) Field of Classification Search .......... 254/2 B, 254/8 R, 9 B; 280/43.14, 43.17, 43.24, 47.29; 269/17
See application file for complete search history.

(56) References Cited

U.S. PATENT DOCUMENTS

| | | | | |
|---|---|---|---|---|
| 1,484,864 A | * | 2/1924 | Bompart | 280/79.11 |
| 2,827,690 A | * | 3/1958 | Brown | 269/17 |
| 3,512,663 A | * | 5/1970 | Guerrico | 414/373 |
| 4,630,837 A | * | 12/1986 | Kazmark | 280/47.2 |
| 4,896,897 A | * | 1/1990 | Wilhelm | 280/655 |
| 5,505,425 A | * | 4/1996 | Shelton | 248/670 |
| 5,716,061 A | * | 2/1998 | Sloan et al. | 280/43.23 |
| 6,557,869 B2 | * | 5/2003 | Gillette et al. | 280/47.28 |
| 6,654,998 B1 | * | 12/2003 | Berdan et al. | 29/464 |
| 7,083,174 B2 | * | 8/2006 | Kane | 280/47.2 |
| 7,097,183 B1 | * | 8/2006 | Su | 280/47.29 |
| 7,357,399 B1 | * | 4/2008 | Klotz | 280/79.11 |
| 7,950,626 B2 | * | 5/2011 | Martin | 254/2 R |
| 8,246,059 B2 | * | 8/2012 | Gass et al. | 280/43.14 |
| 2003/0190219 A1 | * | 10/2003 | Young | 414/11 |

FOREIGN PATENT DOCUMENTS

JP    02204166 A  *  8/1990

* cited by examiner

*Primary Examiner* — Brian Glessner
*Assistant Examiner* — Joseph J Sadlon

(57) ABSTRACT

An apparatus and method of lifting and moving an object is disclosed. The apparatus includes a main frame. The main frame includes a mounting surface, a first angle plate, and a second angle plate. The mounting surface has a horizontal section and a vertical section. The first angle plate is coupled to a first wheel plate and the second angle plate is coupled to a second wheel plate. The apparatus also includes a lift and lock bar for raising and lowering the object. The mounting surface includes slots for receiving the object and retainers for preventing the object from sliding off the mounting surface.

14 Claims, 3 Drawing Sheets

APPARATUS AND METHOD OF LIFTING AND MOVING OBJECTS

RELATED APPLICATIONS

The application claims priority under 35 U.S.C. §119(e) from the U.S. Provisional Patent Application No. 61/170,841, filed on Apr. 20, 2009, and titled "INSTRUCTIONS FOR MOUNTING LIFT LOCK & ROLL WHEELS," the contents of which are hereby incorporated by reference.

FIELD OF THE INVENTION

This invention relates to a lifting apparatus. More specifically, this invention relates to an apparatus capable of lifting and moving numerous objects.

BACKGROUND OF THE INVENTION

Transport of machinery or heavy objects has typically presented challenges for people involved in diverse industries and hobbies. These heavy objects include woods lathes, table saws, band saws, drill presses, grand pianos, and pipe organs.

Many devices are available for moving heavy equipment to and from certain places, such as a factory floor, a workshop or a trade show. Some devices such as cranes are capable of transporting and lifting extremely heavy equipment but are generally expensive, complex and not capable of being used where space is limited. Alternatively, simple dollies that pivot about an axle are portable and easy to use. However, these dollies are not capable of moving heavy objects.

With certain machinery, such as a lathe, many helpers and more than one device is needed to lift and transport the lathe. For example, some lathe operators use an engine crane to load the lathe and cargo straps to pull the crane when the lathe is loaded. Others construct their own "transporters" or flat-topped lifts with wheels to move a lathe after using some combination of hand winches and I-beams to lift the lathe off the floor. It can take a day to load a lathe or other heavy object and a second day to unload it.

What is needed is an apparatus that is capable of lifting and transporting heavy objects in a simple and secure fashion.

SUMMARY OF THE INVENTION

The present invention is directed to an apparatus and/or method of lifting and moving an object. The apparatus includes a main frame, wherein the main frame includes a mounting surface, a first angle plate; and a second angle plate. The mounting surface has a horizontal section and a vertical section. The first angle plate is coupled to a first wheel plate and the second angle plate is coupled to a second wheel plate.

The apparatus also includes a lift and lock bar coupled to a cam rod. The cam rod is coupled to the first angle plate and the second angle plate. The apparatus further includes a first retainer and a second retainer, wherein the retainers are coupled to the horizontal section of the mounting surface and spaced apart from one another. The horizontal section further includes a first slot adjacent the first retainer and a second slot adjacent the second retainer, with each slot configured to receive an object to be lifted and moved, and wherein the retainers are adjusted to prevent the object from sliding off the mounting surface.

In one embodiment, the apparatus also includes a first cam lock and a second cam lock coupled to the lift and lock bar. In another embodiment, the apparatus further includes a first caster assembly coupled to the first wheel plate and a second caster assembly coupled to the second wheel plate, wherein each caster assembly includes a swivel caster and a wheel.

The object of the present invention is, but not limited to, at least one of the following: a lathe, a piano, a wood planer, a table saw, a band saw, and a pipe organ. The main frame is made of, but not limited to, one of the following: metal, wood, and composite In accordance with another embodiment of the present invention, a method of lifting and moving an object is disclosed. The method includes providing a main frame, wherein the main frame includes a mounting surface, a first angle plate, and a second angle plate. The mounting surface has a horizontal section and a vertical section. The first angle plate is coupled to a first wheel plate and the second angle plate is coupled to a second wheel plate.

The method also includes providing a lift and lock bar coupled to a cam rod, wherein the cam rod is coupled to the first angle plate and the second angle plate. The method further includes providing a first retainer and a second retainer. The retainers are coupled to the horizontal section of the mounting surface and spaced apart from one another. The horizontal section further includes a first slot adjacent the first retainer and a second slot adjacent the second retainer, wherein each slot is configured to receive an object to be lifted and moved.

In one embodiment, the method also includes providing a first cam lock and a second cam lock coupled to the lift and lock bar. In another embodiment, the method further includes providing a first caster assembly coupled to the first wheel plate and a second caster assembly coupled to the second wheel plate, wherein each caster assembly includes a swivel caster and a wheel.

In other embodiments, the method includes sliding the mounting surface under the object; adjusting the retainers to prevent the object from sliding off the mounting surface; and adjusting the position of the bar to permit movement of the object. In one embodiment, the bar is lowered until the object is raised, thus locking the wheels in place to then move the object. In another embodiment, the bar is raised until the object is lowered, thus taking pressure off the wheels to then release the object.

DETAILED DESCRIPTION OF THE PREFERRED EMBODIMENTS

Figure 1:
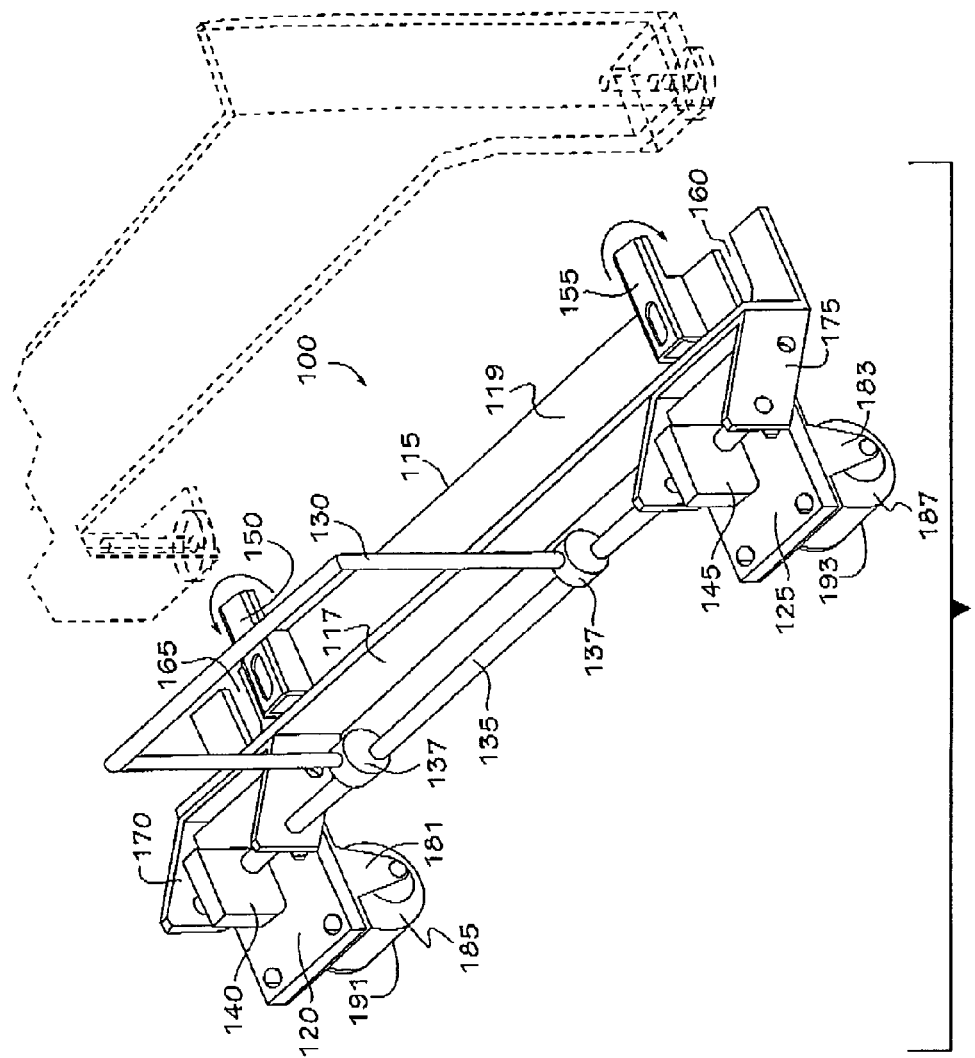
FIG. 1 shows a perspective view of an apparatus for lifting and moving an object, in accordance with one embodiment of the present invention.

FIG. 1 shows a perspective view of an apparatus 100 for lifting and moving an object, in accordance with one embodiment of the present invention. The apparatus 100 comprises a main frame. The main frame includes a mounting surface 115, a first angle plate 170 and a second angle plate 175. The mounting surface 115 has a horizontal section 119 and a vertical section 117. The first angle plate 170 is coupled to a first wheel plate 120 and the second angle plate 175 is coupled to a second wheel plate 125. The main frame is made of, but not limited to, one of the following: metal, wood, and composite.

The apparatus 100 also comprises a lift and lock bar 130. The bar 130 is coupled to a cam rod 135. The cam rod 135 is coupled to the first angle plate 170 and the second angle plate 175.

The apparatus 100 further comprises a first retainer 150 and a second retainer 155. The first retainer 150 and the second retainer 155 are coupled to the horizontal section 119 of the mounting surface 115 and spaced apart from one another. The horizontal section 119 further includes a first slot 165 adjacent the first retainer 150 and a second slot 160 adjacent the second retainer 155. The slots are configured to receive an object (not shown) to be lifted and moved. The retainers 150 and 155 are adjusted to prevent the object from sliding off the mounting surface 115. The object to be lifted and moved comprises, but is not limited to, at least one of the following: a lathe, a piano, a wood planer, a table saw, band saw, and a pipe organ.

In one embodiment, the apparatus 100 further comprises a first cam lock 140 and a second cam lock 145 coupled to the lift and lock bar 130. In another embodiment, the apparatus 100 also comprises a first caster assembly 191 coupled to the first wheel plate 120 and a second caster assembly 193 coupled to the second wheel plate 125. The first caster assembly 191 includes a first swivel caster 181 and a first wheel 185. The second caster assembly 193 includes a second swivel caster 183 and a second wheel 187.

The apparatus 100 of the present invention allows a lathe (or other object) to be raised to expose the wheels of the lathe (or other object) in order to move it. Once the lathe is in place, the wheels can be raised to allow the lathe to sit down on its own leveling pads so that the lathe is stationary.

To mount the lathe, as one example, the mounting surface 115 of the apparatus 100 is slid under the legs of the lathe. The slots of the apparatus 100 should straddle the leveling pads of the lathe. The bar 130 must be in the "up" position with no pressure on the wheels. To raise the lathe, lower the bar 130 until the lathe clears the floor and the bar 130 is horizontal. This will lock the wheels 185 and 187 in place. To lower the lathe, pull up on the bar 130 so it is in a vertical position. This will take the pressure off the wheels 185 and 187 of the apparatus 100 to then release the object.

Figure 2:
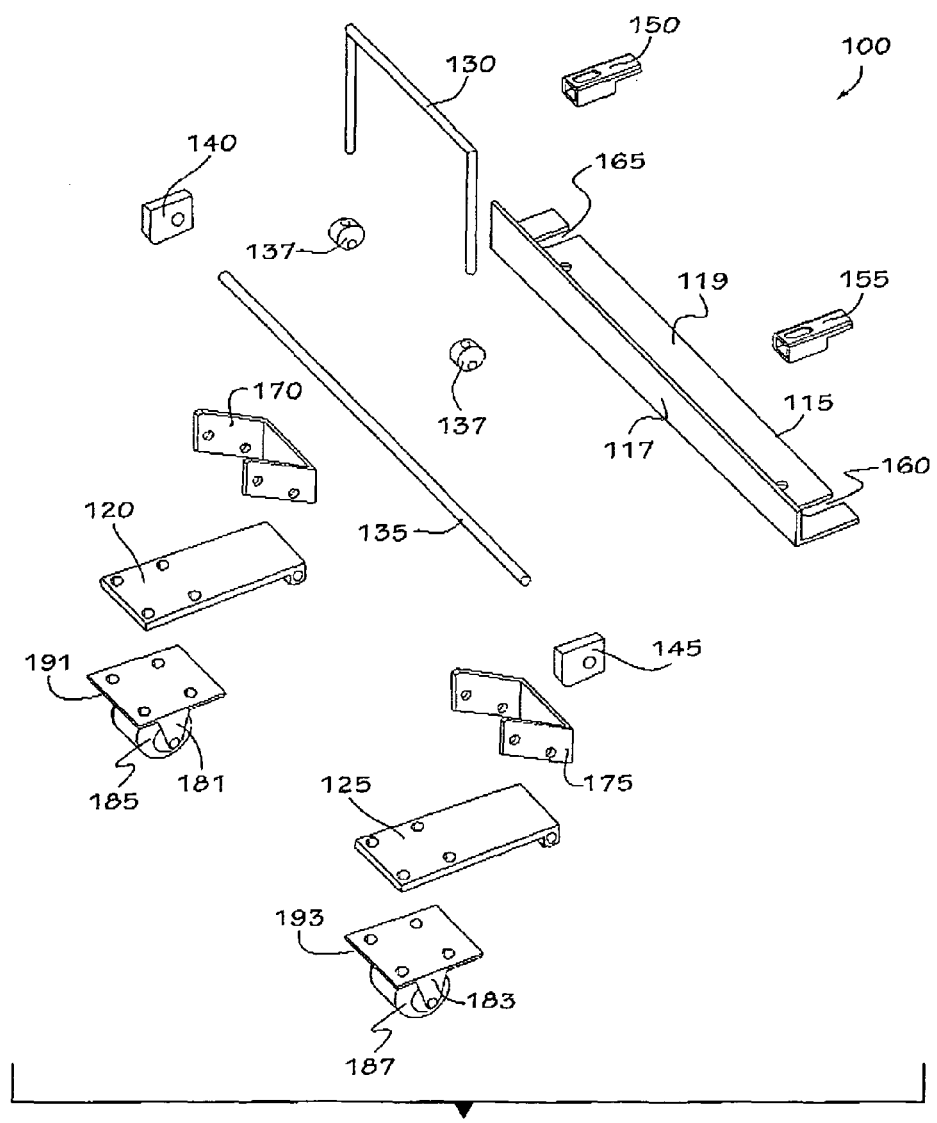
FIG. 2 shows an exploded view of an apparatus for lifting and moving an object, in accordance with one embodiment of the present invention.

FIG. 2 shows an exploded view of an apparatus 200 for lifting and moving an object, in accordance with one embodiment of the present invention. The apparatus 200 comprises a mounting surface 215, a first angle plate 270 and a second angle plate 275. The mounting surface 215 has a horizontal section 219 and a vertical section 217. The first angle plate 270 is coupled to a first wheel plate 220 and the second angle plate 275 is coupled to a second wheel plate 225. The main frame is made of, but not limited to, one of the following: metal, wood, and composite.

The apparatus 200 also comprises a lift and lock bar 230. The bar 230 is coupled to a cam rod 235. The cam rod 235 is coupled to the first angle plate 270 and the second angle plate 275.

The apparatus 200 further comprises a first retainer 250 and a second retainer 255. The first retainer 250 and the second retainer 255 are coupled to the horizontal section 219 of the mounting surface 215 and spaced apart from one another. The horizontal section 219 further includes a first slot 265 adjacent the first retainer 250 and a second slot 260 adjacent the second retainer 255. The slots 265 and 260 are configured to receive an object (not shown) to be lifted and moved. The retainers 250 and 255 are adjusted to prevent the object from sliding off the mounting surface 215. The object to be lifted and moved comprises, but is not limited to, at least one of the following: a lathe, a piano, a wood planer, a table saw, band saw, and a pipe organ.

In one embodiment, the apparatus 200 further comprises a first cam lock 240 and a second cam lock 245 coupled to the bar 230. In another embodiment, the apparatus 200 also comprises a first caster assembly 291 coupled to the first wheel plate 220 and a second caster assembly 293 coupled to the second wheel plate 225. The first caster assembly 291 includes a first swivel caster 281 and a first wheel 285. The second caster assembly 293 includes a second swivel caster 283 and a second wheel 287.

Figure 3:
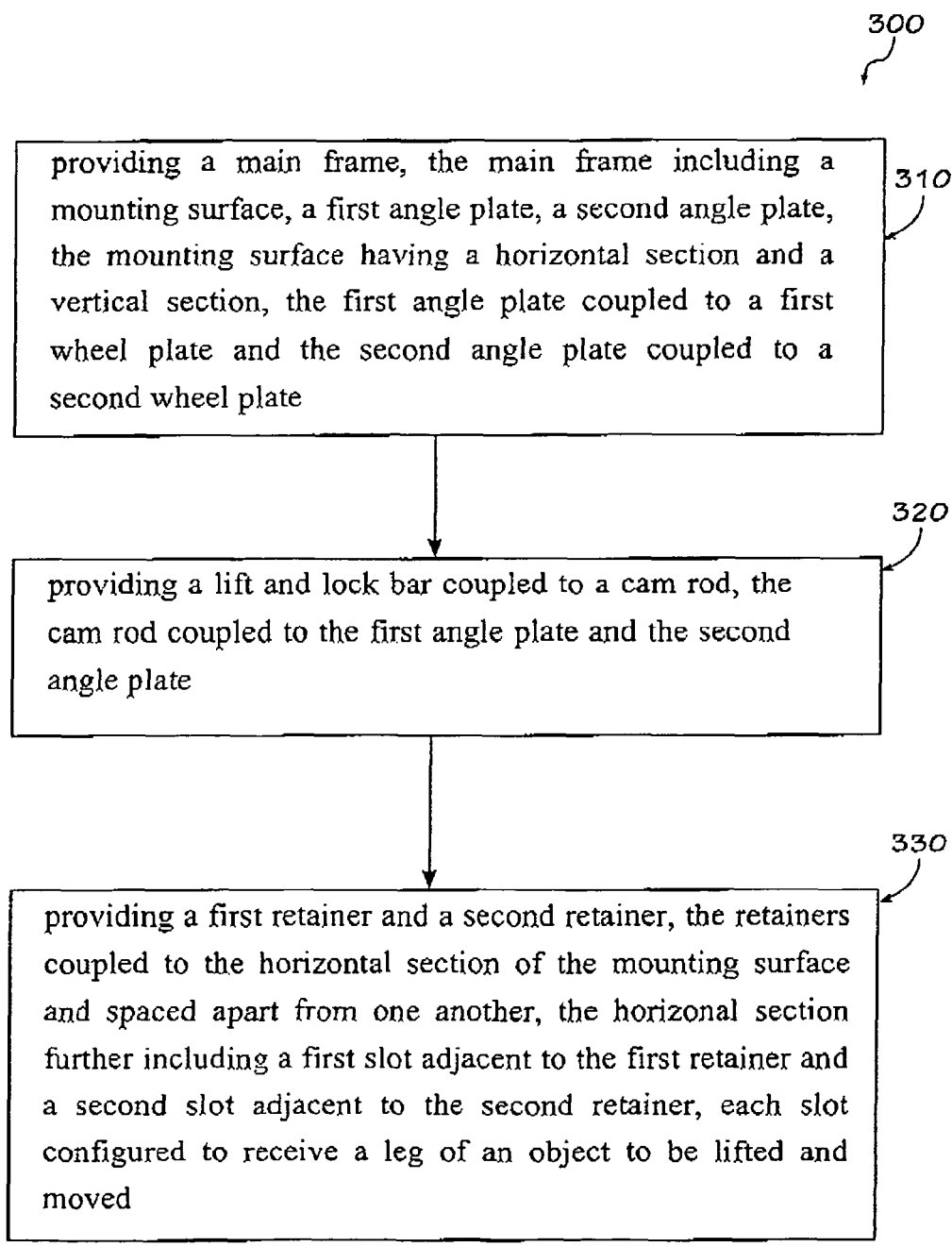
FIG. 3 shows a flowchart of a method of lifting and moving an object, in accordance with one embodiment of the present invention.

FIG. 3 shows a flowchart of a method 300 of lifting and moving an object, in accordance with one embodiment of the present invention. In the Step 310, a main frame is provided. The main frame includes a mounting surface, a first angle plate, and a second angle plate. The mounting surface has a horizontal section and a vertical section. The first angle plate is coupled to a first wheel plate and the second angle plate is coupled to a second wheel plate. In the Step 320, a lift and lock bar is provided. The lift and lock bar is coupled to a cam rod. The cam rod is coupled to the first angle plate and the second angle plate. In the Step 330, a first retainer and a second retainer are provided. The retainers are coupled to the horizontal section of the mounting surface and spaced apart from one another. The horizontal section of the mounting surface further includes a first slot adjacent the first retainer and a second slot adjacent the second retainer. Each slot is configured to receive a part or section, such as a leg, of an object to be lifted and moved.

Referring to FIG. 3, in some embodiments, a first cam lock and a second cam lock are provided. The cam locks are coupled to the lift and lock bar. In other embodiments, a first caster assembly coupled to the first wheel plate and a second caster assembly coupled to the second wheel plate, are provided. Each caster assembly includes a swivel caster and a wheel. In another embodiment, the mounting surface is slid under the leg of the object and the retainers are adjusted to prevent the object from sliding off the mounting surface.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modification may be made in the embodiments chosen for illustration without departing from the spirit and scope of the invention.

What is claimed is:

1. An apparatus for lifting and moving an object comprising:
   a. a main frame including a mounting surface, a first angle plate, and a second angle plate, the mounting surface having a horizontal section and a vertical section, the first angle plate coupled to a first wheel plate and the second angle plate coupled to a second wheel plate;
   b. a lift and lock bar coupled to a cam rod, the cam rod coupled to the first angle plate and the second angle plate; and
   c. a first retainer and a second retainer, the retainers coupled to the horizontal section of the mounting surface and spaced apart from one another, the horizontal section further including a first slot adjacent the first retainer and a second slot adjacent the second retainer, each slot configured to receive an object to be lifted and moved, wherein the retainers are adjusted horizontally, along the horizontal section of the mounting surface, to prevent the object from sliding off the mounting surface.

2. The apparatus of claim 1 further comprising a first cam lock and a second cam lock coupled to the lift and lock bar.

3. The apparatus of claim 2 further comprising a first caster assembly coupled to the first wheel plate and a second caster assembly coupled to the second wheel plate, wherein each caster assembly includes a swivel caster and a wheel.

4. The apparatus of claim 1 wherein the object comprises at least one of the following: a lathe, a piano, a wood planer, a table saw, a band saw, and a pipe organ.

5. The apparatus of claim 1 wherein the main frame is made of one of the following: metal, wood, and composite.

6. A method of lifting and moving an object comprising:
   a. providing a main frame, the main frame including a mounting surface, a first angle plate, and a second angle plate, the mounting surface having a horizontal section and a vertical section, the first angle plate coupled to a first wheel plate and the second angle plate coupled to a second wheel plate;
   b. providing a lift and lock bar coupled to a cam rod, the cam rod coupled to the first angle plate and the second angle plate;
   c. providing a first retainer and a second retainer, the retainers coupled to the horizontal section of the mounting surface and spaced apart from one another, the horizontal section further including a first slot adjacent the first retainer and a second slot adjacent the second retainer, each slot configured to receive an object to be lifted and moved; and
   d. adjusting the retainers horizontally along the horizontal section of the mounting surface, to prevent the object from sliding off the mounting surface.

7. The method of claim 6 further comprising providing a first cam lock and a second cam lock coupled to the lift and lock bar.

8. The method of claim 7 further comprising providing a first caster assembly coupled to the first wheel plate and a second caster assembly coupled to the second wheel plate, wherein each caster assembly includes a swivel caster and a wheel.

9. The method of claim 8 further comprising sliding the mounting surface under the object.

10. The method of claim 6 further comprising adjusting the position of the bar to permit movement of the object.

11. The method of claim 10 wherein the bar is lowered until the object is raised, thus locking the wheels in place to then move the object.

12. The method of claim 10 wherein the bar is raised until the objected is lowered, thus taking pressure off the wheels to then release the object.

13. The method of claim 6 wherein the object comprises at least one of the following: a lathe, a piano, a wood planer, a table saw, a band saw, and a pipe organ.

14. The method of claim 6 wherein the main frame is made of one of the following: metal, wood, and composite.

* * * * *